Oct. 30, 1962 H. L. SMITH, JR., ETAL 3,060,724
APPARATUS AND METHOD FOR MEASURING THE VOLUME
AND DENSITY OF SOLID MATERIAL
Filed Jan. 6, 1959 4 Sheets-Sheet 1

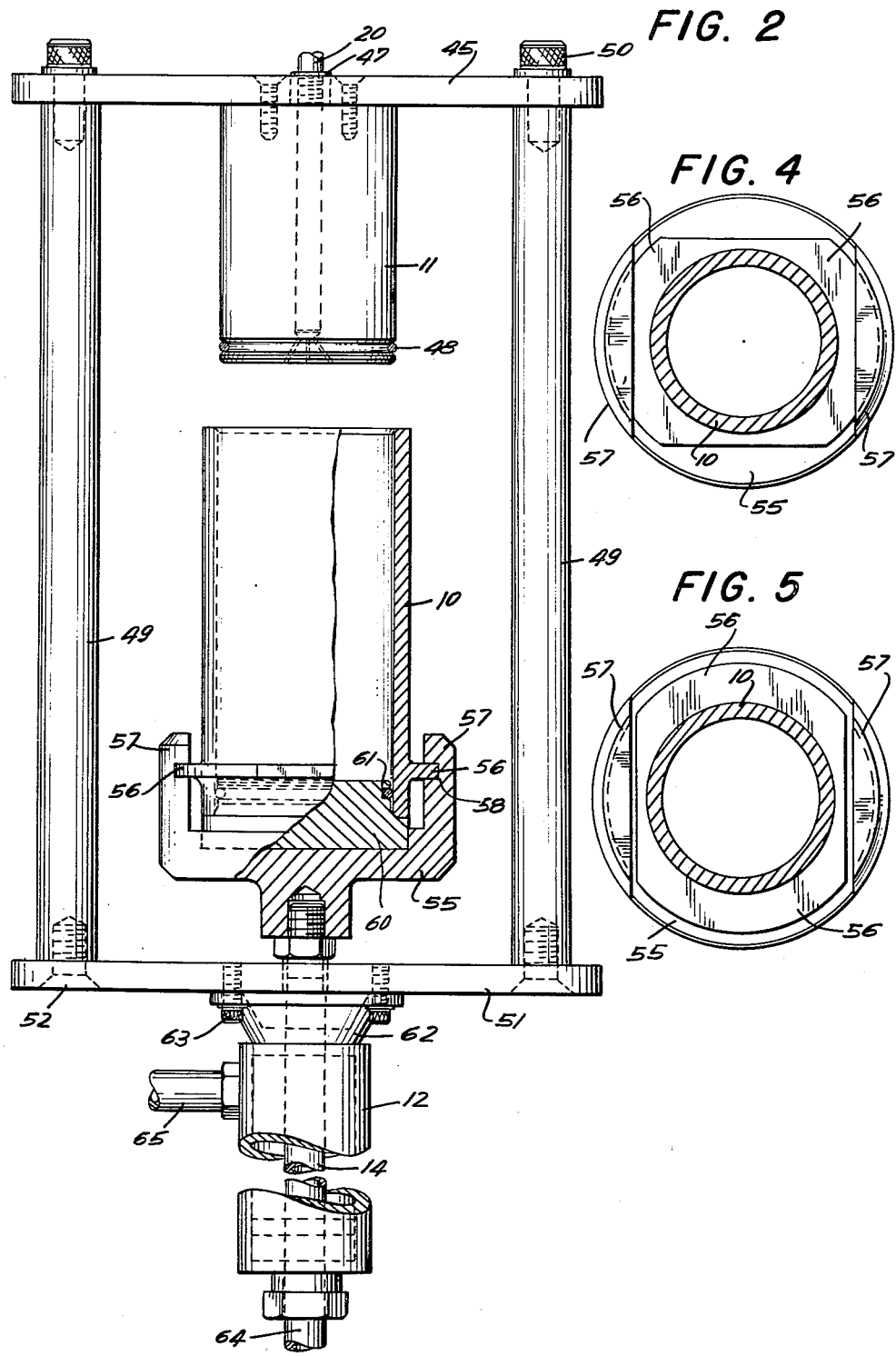

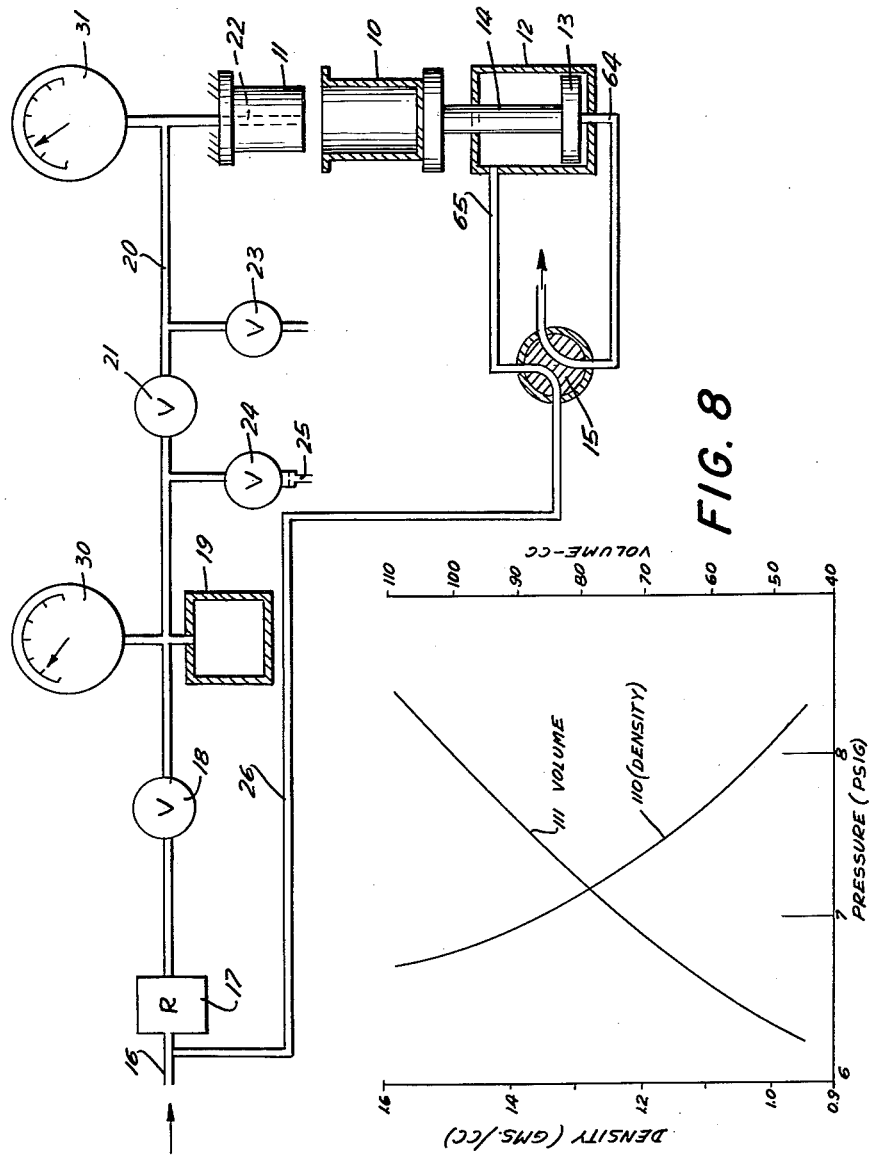

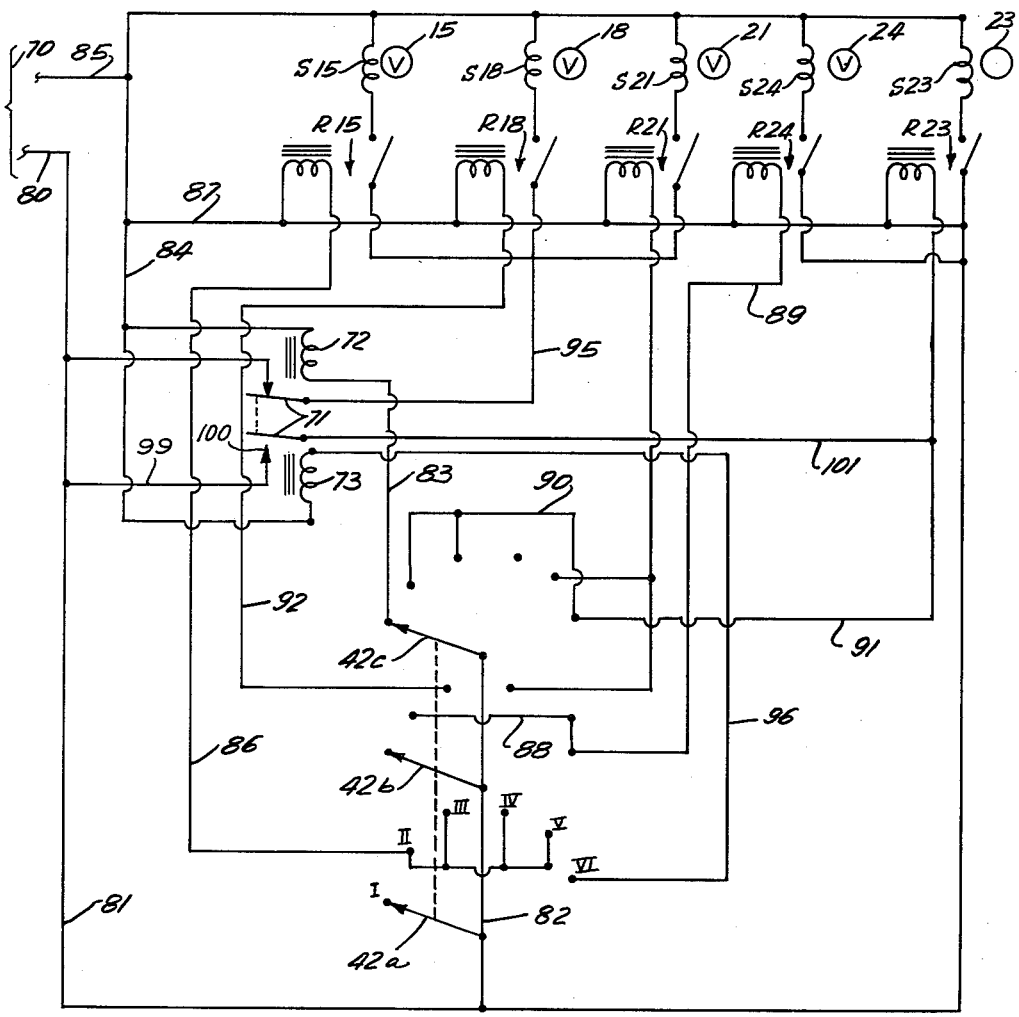

United States Patent Office 3,060,724
Patented Oct. 30, 1962

3,060,724
APPARATUS AND METHOD FOR MEASURING THE VOLUME AND DENSITY OF SOLID MATERIAL
Horace L. Smith, Jr., and Valentine Lichtenstein, Richmond, Va., assignors to Philip Morris Incorporated, New York, N.Y., a corporation of Virginia
Filed Jan. 6, 1959, Ser. No. 785,185
16 Claims. (Cl. 73—32)

The present invention is concerned with the measurement of the density or volume of solid material of irregular shape or divided form or both. An example of such material is tobacco and particularly tobacco in shredded form. Tobacco is commonly purchased by weight and it is of practical value to a manufacturer of tobacco products such as cigarettes to obtain data indicating the relation between the weight of the tobacco and the volume thereof in the manufactured product. In other words the filling power per unit of weight is of considerable importance.

Another specific example of the application and object of the invention is in the measurement of the density or volume of irregularly shaped solid masses. In general the object is to effect the measurement of solid material excluding the void spaces in the surface and between particles.

The density value obtained is of course equal to the specific gravity and more precisely in the present case to the apparent specific gravity of the solid parts of the material exclusive of voids between the solid parts as distinguished from the bulk or over-all specific gravity which includes such voids. The invention enables the ready determination of desired data and comparison with established standards.

In general the apparatus and method involve a system in which a quantity or mass of the material to be tested is inserted in an expansible chamber, the chamber then contracted to a predetermined volume, after which it is placed in fluid communication with a supply container of fixed volume having a charge of gas at a known initial pressure, and finally a pressure reading is taken of the expanded volume of gas. In the present invention this final pressure is then referred to a pre-established curve of a character which affords a direct determination of the density or volume of the test material. The expansible chamber feature enables a bulky flexible material having normally large voids between solid elements or particles to be measured with a close degree of accuracy. The bulky material may be initially in a quantity to occupy substantially the maximum expanded volume of the test chamber and then compressed to the test volume before the chamber is connected to the charging container. The greater net volume of the solid material relative to the gas volumes results in a greater accuracy. The system is readily adaptable to the measurement of a variety of materials and different conditions, and may be operated by unskilled operators. Contributing in considerable measure to the practicability of the apparatus is the system of controls which includes an electrical control circuit associated with a manual switch constructed and arranged whereby the operator is required merely to insert the material in the test chamber and then move the switch through a series of positions including one in which the pressure reading is taken.

Various other advantages and objects will be apparent from the description and showing of a specific embodiment thereof. The invention accordingly comprises the construction and combination of elements and arrangement of parts comprising a physical embodiment of the apparatus and the various operating steps and the relation thereof with respect to each other comprising the method, all as exemplified in the following detailed disclosure.

Reference should be had to the accompanying drawings in which:

FIG. 2 is an enlarged detail in elevation of the material test cylinder and its operating mechanism;

FIG. 4 is a cross-sectional view of the cylinder taken on the line 4—4 of FIG. 1;

FIG. 5 is a view somewhat similar to FIG. 4 but showing the cylinder rotated to a release position;

FIG. 6 is a diagrammatic view of the complete fluid system;

FIG. 7 is a diagram of the electric circuitry for controlling the operation of the mechanism; and FIG. 8 is a chart showing representative types of reference curves for determining the ultimate value or data sought from the pressure reading obtained from the apparatus.

Figure 1:
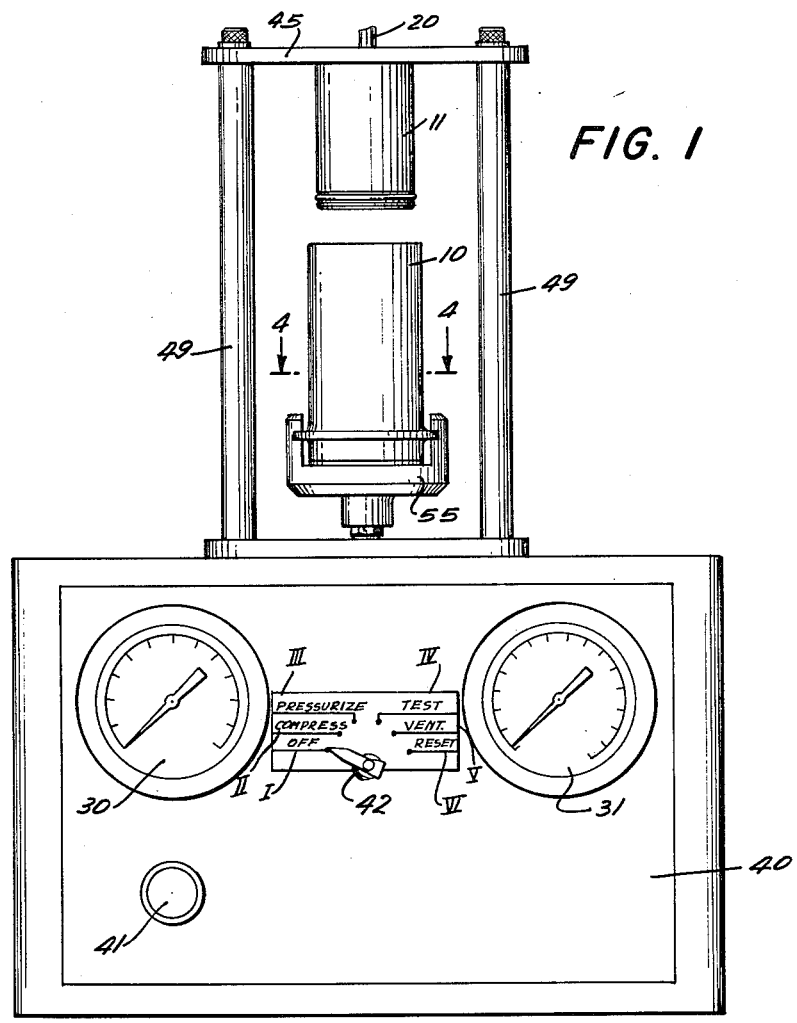
FIG. 1 is a view in elevation of the complete assembled mechanism.

The apparatus is shown in general in FIG. 1 and the fluid operating system is shown diagrammatically in FIG. 6.

Referring first to FIG. 6 for a description of the general features of the apparatus, the test chamber embodies an expansible chamber comprising in the present embodiment of the invention a cylinder 10 and a piston 11 movable relative to each other. In the present apparatus the piston 11 is fixed and the cylinder is vertically reciprocated by a fluid pressure power apparatus comprising a cylinder 12 and a piston 13 therein secured to piston rod 14 the opposite end of the rod being secured to the test cylinder 10. In the normal position of rest, such as that shown, the cylinder is completely retracted from the piston leaving an open end for the insertion of test material into the cylinder, and for the removal of the cylinder if desired. The operating cylinder 12 is controlled by a four-way valve 15.

A source of expansible fluid such as air under pressure is indicated at 16, the air being delivered through a regulator 17, which may be of conventional design, through a control valve 18 to a supply or charging container 19. The air under pressure in the container 19 may be placed in fluid communication with the cylinder 10 through the conduit 20 having therein a control valve 21. The piston 11 is provided with an axial passage 22 adapted to communicate with the interior of cylinder 10 when the piston and cylinder are in advanced position with the piston occupying a position within the cylinder.

The conduit 20 is provided with vent valves 23 and 24, the valve 24 being employed in conjunction with a restricted outlet orifice 25 for the purpose to be later described. A branch conduit 26 leads from the source of gas under pressure to the four-way valve 15 for supplying fluid to the power operating cylinder 12. The charging cylinder 19 is at all times in communication with a pressure gage 30 and the pressure gage 31 communicates with the conduit 20.

The general structural arrangement is shown in FIG. 1. The valves and control system and part of the mechanism are mounted within a cabinet 40. On the top thereof in convenient exposed position is the test cylinder 10 and the fixed piston 11. Exposed in the front face of the cabinet are the pressure gages 30 and 31. A regulator knob is indicated at 41 for controlling the pressure regulator 17 shown diagrammatically in FIG. 6. Mounted on the front face of the cabinet is also a manually operable rotary switch handle 42 adapted to be moved through a series of positions for an operating cycle as will be more fully described later. Various other elements may be mounted in or on the cabinet as desired such as pilot lights, and a master switch.

Figure 3:
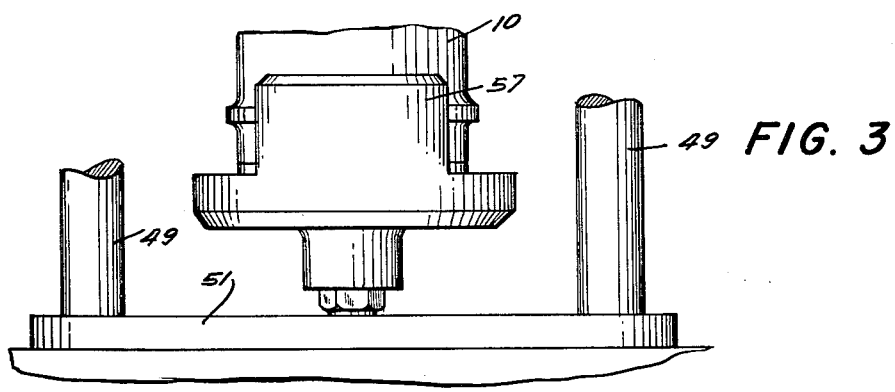
FIG. 3 is a fragmentary detail of the mounting for the test cylinder enabling it to be readily removed.

The structural details of the test chamber and its mounting are shown more fully in FIGS. 2 to 5 inclusive. The piston 11 is secured to a top plate 45 by means of countersunk screws, the piston preferably having a locating boss 47 received in an opening in the plate 45. The piston is provided with suitable packing indicated generally at 48. The plate 45 is mounted on a series of vertical posts 49 of which there preferably are four equally spaced in the form of a rectangle, the plate being secured to the respective posts by socket screws 50. The lower ends of the posts 49 are secured to a bottom plate 51 by means of countersunk set screws 52, the plate 51 being in turn secured in rigid fixed position on the frame of the cabinet 40. Test cylinder 10 is removably secured to a bracket 55 by means of a bayonet type connection including the flange portions 56 of limited angular extent as indicated in FIG. 5 extending radially from the cylinder. The bracket 55 is provided with the up-standing arms 57 of likewise limited angular extent as indicated in FIG. 3. In assembled relation the flange elements 56 on the cylinder are rotated into slots 58 in the bracket arms 57, as shown in FIG. 2. To remove the cylinder it is merely necessary to rotate it to the position shown in FIG. 5 where it may be freely lifted from the bracket. The lower end of the cylinder is provided with a closure member 60 which if desired may be made removable from the cylinder when the cylinder is detached from its mounting in order to enable the contents of the cylinder to be pushed out in case they should be packed into the bottom part. The cylinder must, however be air-tight and appropriate packing is provided as indicated generally at 61. The lower enlarged cylinder portion of the closure member 60 is adapted to fit closely and be centered in a recess in the upper surface of the bracket 55.

The bracket 55 is secured to the upper end of the piston rod 14 which operates through suitable packing means in the upper end of the cylinder 12. The upper end of the cylinder is secured to a bracket 62 which in turn is secured by set screws 63 to the fixed plate 51. The cylinder is provided with the pipe connections 64 and 65 leading from the control valve 15 shown in FIG. 6. In the operating cycle the cylinder is moved upwardly until its upper rim engages the top plate 45 where it is held for a period by the fluid pressure in the power cylinder. The piston is shorter than the cylinder leaving a space below the piston of predetermined volume in which the test material is located. If desired the mounting for the cylinder may be made adjustable, or an adjustable stop means may be provided for determining the volume of the test space.

Each of the valves 15, 18, 21, 23 and 24 is operated from a solenoid each of which is in turn controlled from a relay switch and all of the relays and the complete cycle of the apparatus are controlled from the manual switch 42 shown in FIG. 1. The control circuit is shown in generally diagrammatic form in FIG. 7. The respective valves are indicated in FIG. 7 by the same reference numerals as employed in FIG. 6. The solenoids are indicated at S15, S18, S21, S23 and S24 respectively. The current through the respective valve solenoids is controlled by a relay switch operated by an associated solenoid in each case. The switches and their respective solenoids are designated R15, R18, R21, R23, and R24. Each switch is normally biased to open position by a spring in accordance with conventional designs. In the case of the four-way valve 15 when its solenoid S15 is de-energized the valve 15 is held by a suitable means such as a spring in the position shown in FIG. 6. When its solenoid S15 is energized the valve is rotated 90° clockwise from the position shown in FIG. 6 to place the lower end of cylinder 12 in communication with the source of pressure fluid and connect the upper end of cylinder 12 to vent. Each of the other valves 18, 21, 23 and 24 is in a closed position when its respective solenoid is not energized, being so held by a suitable means such as a spring, and in each case is moved to a closed position when its solenoid is energized.

The source of electrical power is indicated at 70. The circuit is controlled from a single rotatable button or lever identified at 42 in FIG. 1. The button 42 controls a three-gang switch including three switch arms indicated at 42a, 42b and 42c in FIG. 7. The arms 42a, 42b and 42c of course rotate together and the arms have six positions indicated by Roman numerals I, II, III, IV, V and VI in FIG. 1. The circuit also includes a double pole latch switch indicated at 71 in FIG. 7 which always occupies one or the other of two positions it being moved to the upper position by the solenoid 72 and to its lower position by solenoid 73.

The circuits and the connections will be more easily understood from a discussion of the several positions and events of the cycle. In FIGS. 1 and 7 the switch 42 is set in the position I which in accordance with a legend on FIG. 1 is the "off" position. In such setting the circuit of principal importance is from one side of the electrical source 80 through lines 81, 82, 83, solenoid 72 and line 84 back to the other side of the source at 85. At this setting, therefore, the solenoid 72 is energized and the latch switch 71 is moved to the upper position as shown in FIG. 7. None of the circuits to the valve relay switches are energized and accordingly each of the valves 18, 21, 23 and 24 is in its closed position and the valve 15 for controlling the power cylinder 12 is in the position shown in FIG. 6 and the piston 13 and its cylinder 10 are in the lowermost retracted position.

To perform a measurement the material is inserted in the cylinder 10 and the cylinder placed in the position shown in FIG. 1. The main switch button 42 is then shifted to position II identified in FIG. 1 as the "Compress" position. In this position relay switch R15 is closed through switch arm 42a, line 86, the relay solenoid R15 and branch 87 back to the other side of the source 85. Accordingly valve 15 is rotated to its other position admitting air to the lower end of cylinder 12 moving the test cylinder upwardly until it engages against the stop plate 45. Relay switch R24 is also closed through the circuit from 80 through switch arm 42b, lines 88 and 89 through the solenoid R24 back to branch line 87 and the other side of the source 85. Likewise relay switch R23 is closed through switch arm 42c, lines 90 and 91 through the solenoid R23 to the branch line 87 and back to the other side of the circuit 85. Accordingly valves 24 and 23 are open permitting the air to be exhausted freely from the test cylinder 10.

In the next position III which comprises the "Pressurize" phase as indicated in FIG. 1, the circuit to relay switch R24 is broken and accordingly valve 24 is closed. Valve 18, however, is now opened. The circuit in this respect comprises the switch arm 42b, line 92, through the solenoid R18, and back through branch 87 to the opposite side of the circuit 85. In this position, therefore, with valve 18 open high pressure gas is permitted to flow into the charging cylinder 19 but valves 21 and 24 are closed as described. There is now contained in the chamber 19 a fixed volume of gas at a predetermined pressure.

In the next step in which the switch lever is moved to the position IV, comprising the "Test" position, the valves 15 and 24 remain as in position III, that is valve 24 is closed and the valve 15 remains as previously set with the piston 13 and its cylinder 10 held in the uppermost position. The other three valves 18, 21 and 23, however, are reversed from the preceding positions respectively. In other words valve 18 is now closed, valve 21 is open and valve 23 is closed. In this test position, after the gas in charging chamber 19 has expanded into the established space in cylinder 10, the pressure on gage 31 is observed which as will be described more fully later comprises the critical test data for determining the value sought.

The above completes the operating test part of the cycle. For the next phase the switch is moved to position V which is as indicated the "Vent" position. In this position the position of the valves is as follows: valve 15 remains in the position holding the power piston in upper position, valve 18 is closed, valve 21 is open, valve 24 is open and valve 23 is closed. Valve 23 remains closed so that the vent is at this stage solely through the valve 24 and restricted orifice 25 thereby preventing injury to the gage 31 through a sudden drop to atmospheric pressure.

The next and final position VI comprises the "Reset" position. One of the chief functions accomplished in this position is to move the latch switch 71 to the lower position opposite to that shown in FIG. 7 whereby the circuit to the line 95 and the branches leading to the relay switches R15, R18 and R21 is broken and as the manual switch 42 is moved back in the next operation to the number I or "off" position these relay switches will not be closed in the temporary sweep of the switch arms through the several contacts. The circuit in position VI for shifting latch 71 downwardly is through the line 81, switch arm 42a, line 96 and solenoid 73 and line 84 back to the other side of the circuit 85. In this "Reset" position VI the circuit to relay solenoid R15 is broken and valve 15 is automatically moved to the position shown in FIG. 1 and pressure is connected to the upper end of power cylinder 12 causing the test cylinder 10 to be retracted to its lowermost position. Valve 24 in this position remains open as before, but now valve 23 is also opened to the atmosphere permitting free flow of air into or out of the cylinder 10 as it is withdrawn into its lower position. The circuit to solenoid R23 is by way of line 81, arm 42c, and line 91 through the solenoid R23 to line 87 and back to the other side of the source 85. The solenoid R23 is also energized through the line 99, contact 100 and line 101 to the solenoid and back to the other side of the line 85 as before. The foregoing completes the cycle and the switch arm 42 is returned to the "off" position I where the condition is as heretofore described for that setting. If desired the switch arm and associated elements may have associated therewith a device preventing return movement of the switch until it has been advanced through to the final position VI.

As mentioned the pressure reading on the gage 31 obtained at the test position is utilized to determine the data or value sought and particularly by reference to a pre-established curve obtained by operation on standards of known values. For example if the density or apparent specific gravity is desired, a curve such as that shown at 110 in FIG. 8 is derived. For purposes of illustration certain values will be assumed in the following description which are representative of a standard apparatus and operation. For example in the case of measuring the density of tobacco a standard weight is selected. In an actual apparatus the test cylinder 10 has an internal diameter of about 3 inches and with the cylinder up in its test position the net volume comprised approximately 11 cubic inches. The selected standard weight was 100 grams of tobacco. For deriving a curve like that shown at 110 in FIG. 8 a series of standard samples of known density and in an amount equaling the selected standard weight were successively inserted in the test cylinder 10 and submitted to the operation described in detail above including a reading of the pressure on the gage 31 in the test stage and a value for the respective known density and the pressure read entered on a graph sheet and the curve 110 derived therefrom. The initial pressure in the charging chamber 19 in the example being described was 30 p.s.i.g. and the final pressure of the expanded volume after opening valve 21 was in the range between 6 to 9 p.s.i.g. as indicated by the curve 110.

A curve representing volume may be similarly established. In other words known volumes of a solid nonporous object or material, free of voids were successively inserted in the test cylinder 10 and the standard operation performed on each, thereby deriving points through which the curve 111 was drawn. The solid mass for such purposes to establish the standard curve may be of course a liquid such as water of a measured quantity for each test. With such a curve the net volume of a solid material exclusive of void spaces can be readily determined. Having establishing the standard reference curves the determination of the density or net volume may be easily and simply accomplished by the procedure described. To determine the net volume it is necessary merely to insert in the test chamber a sample in the amount of the selected standard weight and perform the cycle taking a reading on the gage 31 at the test stage. To determine the volume the sample is merely inserted in the chamber and the standard cycle performed thereon. The system, including the open top expansible chamber, is particularly advantageous in testing bulky materials such as tobacco or random textile fibers having normally large voids. A relative large quantity of the bulky material may be inserted initially in the expansible chamber and upon compression the void spaces are considerably reduced. A higher ratio of net volume of solid material to gas volume is involved and accordingly a higher degree of accuracy.

It should be understood that when the term "measuring a solid material" is employed herein, it is intended to include the determination of any one of the physical characteristics of a material of which the apparatus or method is capable.

Either of the tests as to density or volume is applicable to all sorts of materials such as a single mass of irregular shape and having perhaps voids in the surface thereof, or it may be applied to bulk or particulate material such as tobacco having voids between particles. In this respect it may be noted that the test reading on the gage 31 may be referred to one standard curve such as the curve 110 for determination of the density of the material, and the same pressure reading referred to the curve 111 for a determination of the volume.

Since certain changes in carrying out the above process and in the constructions set forth, which embody the invention may be made without departing from its scope, it is intended that all matter contained in the above description and shown in the accompanying drawings shall be interpreted as illustrative and not in a limiting sense.

We claim:

1. In a solid material measuring apparatus, a piston and an open ended cylinder, said piston being adapted to effect a hermetically sealed cylinder chamber, supporting means for each of said piston and cylinder, the supporting means for said cylinder including a freely disconnectable mounting adapted to permit ready removal and attachment of the cylinder, means for effecting relative movement between said piston and cylinder including movement to an advanced test position with a predetermined closed cylinder volume for the test material, means for admitting fluid into the cylinder in the test position, and a pressure gage with fluid connections into said cylinder in the test position.

2. In a solid material measuring apparatus an open ended cylinder and a piston therefor, means connected to said cylinder for supporting and vertically reciprocating it with the open end arranged upwardly, means for supporting said piston in fixed position overhead said cylinder and in operative relation thereto, the supporting means for said cylinder including a bayonet type quickly disconnectable mounting adapted to permit ready manual removal and attachment of the cylinder as a self-contained independent unit, said cylinder in its reciprocatory movement having a retracted position in which it is separated from said piston, and a pressure gage with fluid connections through said piston adapted to communicate with the interior of the cylinder in advanced position thereof.

3. An apparatus for measuring solid material by fluid pressure comprising, a relatively movable cylinder and piston with the piston slidable therein in continuous fluid sealing relation, said cylinder being adapted to receive therein the solid material, means for effecting relative movement between said cylinder and piston to a test position providing a predetermined hermetically sealed cylinder volume in which the material is located, means for admitting an expansible fluid into said cylinder at the test position from a closed container of the fluid of fixed volume and means for measuring the fluid pressure in said container and cylinder.

4. A method of measuring the density of solid material comprising placing the material in an expansible chamber and reducing the chamber to a predetermined volume, connecting the chamber to a container of fixed volume of expansible fluid at a predetermined pressure, measuring the pressure in the system with the expansible chamber and container in fluid communication, and determining the density of the material directly by referring the observed pressure to a pre-established curve derived from similar measurements of known densities plotted against observed pressures.

5. A method of measuring the density of solid material comprising, placing a predetermined standard weight of the material in a closed chamber of predetermined volume, connecting the chamber to a container of fixed volume of expansible fluid at a predetermined pressure, measuring the pressure in the system with the expansible fluid chamber and container in fluid communication, and determining the density of the material directly by referring the observed pressure to a pre-established curve derived from similar measurements of known densities plotted against observed pressures.

6. A method of measuring the volume of solid material comprising placing the material in an expansible chamber and reducing the chamber to a predetermined volume, connecting the chamber to a container of fixed volume of expansible fluid at a predetermined pressure, measuring the pressure in the system with the expansible chamber and container in fluid communication, and determining the volume of the material directly by referring the observed pressure to a pre-established curve derived from similar measurements of known volumes plotted against observed pressures.

7. An apparatus for measuring solid material by fluid pressure embodying, an expansible chamber adapted to receive the material to be measured, operating means for adjusting said expansible chamber to a contracted test position of predetermined volume and to an expanded position, a supply container for holding a predetermined volume of expansible fluid, fluid conduit means connecting said container and expansible chamber, valve means for selectively connecting said expansible chamber to exhaust and to said supply container, gage means for measuring the pressure in said chamber, and a control system connected to said operating means and valve means for effecting a cycle of operation comprising the steps of operating said expansible chamber to the test position while vented to the atmosphere, closing the vent and placing said chamber in fluid communication with said supply container and permitting a gage reading to be taken of the combined volumes, again venting the said chamber, and operating said chamber to its expanded position.

8. An apparatus for measuring solid material by fluid pressure embodying, an expansible chamber adapted to receive the material to be measured, operating means for adjusting said expansible chamber to a contracted test position of predetermined volume and to an expanded position in which the material may be inserted in the chamber, a supply container for holding a predetermined volume of expansible fluid, fluid conduit means connecting said container and expansible chamber, valve means for selectively connecting said expansible chamber to exhaust and to said supply container, gage means for measuring the pressure in said chamber, a control system connected to said operating means and valve means for effecting a cycle of operation comprising the successive steps of operating said expansible chamber to the test position while vented to the atmosphere, closing the vent and placing said chamber in fluid communication with said supply container and permitting a gage reading to be taken of the combined volumes, again venting the said chamber, and operating said chamber to its expanded position, and a control member manually operable to successive positions and connected into said system to effect the successive steps.

9. An apparatus for measuring solid material by fluid pressure embodying, an expansible chamber adapted to receive the material to be measured, operating means for adjusting said expansible chamber to a contracted test position of predetermined volume and to an expanded position, a supply container for holding a predetermined volume of expansible fluid, fluid conduit means connecting said container and expansible chamber, valve means for selectively connecting said expansible chamber to exhaust and to said supply container, gage means for measuring the pressure in said chamber, a control system including electrical operating devices and electric circuitry connected to said operating means and valve means for effecting a cycle of operation comprising the steps of operating said expansible chamber to the test position while vented to the atmosphere, closing the vent and placing said chamber in fluid communication with said supply container and permitting a gage reading to be taken of the combined volumes, again venting the said chamber, and operating said chamber to its expanded position, and manually operable means for governing said control system to effect the steps at will.

10. Apparatus for measuring solid material by fluid pressure comprising a piston and cylinder, fluid pressure power means and control valve means for effecting relative movement between said piston and cylinder to a forward contracted chamber position and a retracted material inserting position, a supply chamber for holding a predetermined volume of expansible fluid at a selected initial pressure, fluid conduit means connecting said cylinder and container, valve means for controlling flow through said conduit, valve means for connecting said cylinder to vent, gage means for measuring the pressure in said cylinder, electrical solenoid means for operating each of said valve means, electric circuitry including a manual control means for controlling said solenoid means in appropriate relation and in a succession of steps to perform an operating cycle.

11. The method of measuring a physical property of a bulky compressible material comprising charging an expansible chamber with a volume in excess of a predetermined test volume, reducing the chamber to said test volume and simultaneously compressing and confining the material charge therein, connecting the chamber to a container of fixed volume of expansible fluid at a predetermined pressure in an otherwise hermetically sealed system, and measuring the pressure in the system.

12. In a solid material measuring apparatus, a piston and an open ended cylinder movable relative to each other, said piston being slidable within said cylinder and being normally impervious to fluid and having a continuous peripherally close fluid sealing relation with the interior of said cylinder along its longitudinal path in said cylinder, and said piston and cylinder having a relatively retracted position in which the piston is withdrawn from the cylinder and the cylinder is free to receive the material at its open end, and an advanced test position in which the piston establishes a predetermined closed cylinder volume, means for admitting measuring fluid into said cylinder in the test position, and a pressure gage with fluid connections into said cylinder in the test position.

13. In a solid material measuring apparatus, a piston and an open ended cylinder movable relative to each other, said piston being slidable within said cylinder and being normally impervious to fluid and having a continuous peripherally close fluid sealing relation with the interior of said cylinder along its longitudinal path in said cylinder, and said piston and cylinder having a relatively retracted position in which the cylinder is free to receive the material at its open end, and an advanced test position, positive stop means to limit the said advanced position and thereby establish a predetermined closed cylinder volume, an auxiliary fluid container, control valve means for selectively controlling the admission and exhaust of fluid from said auxiliary chamber and cylinder and placing them in fluid communication, and a pressure gage with fluid connections into said cylinder in the test position.

14. In a solid material measuring apparatus, a piston member and an open ended cylinder member, a first one of said members being mounted in fixed position and the other member being movable in guide means in a fixed path relative to the first member, said piston being slidable within said cylinder and being normally impervious to fluid and having a continuous peripherally close fluid sealing relation with the interior of said cylinder along its longitudinal path in said cylinder, and said piston and cylinder having a relatively retracted position in which the piston is withdrawn from the cylinder and the cylinder is free to receive the material at its open end, and an advanced test position, positive stop means to limit the said advanced position and thereby establish a predetermined closed cylinder volume, means for admitting measuring fluid under pressure into said cylinder in the test position, and a pressure gage with fluid connections into said cylinder in the test position.

15. In a solid material measuring apparatus, a piston member and an associated open ended cylinder member, said piston being mounted in fixed position and said cylinder being movable in guide means in a fixed path relative to said piston to cause reciprocatory movement of the piston within said cylinder, and said piston and cylinder having a relatively retracted position in which the piston is withdrawn from the cylinder and the cylinder is free to receive a charge of said material at its free open end, and an advanced test position, positive stop means to limit the said advanced position and thereby establish a predetermined closed cylinder volume, means for admitting fluid under pressure through said piston into said cylinder, and a pressure gage with fluid connections into said cylinder in the test position.

16. An apparatus for measuring solid material by fluid pressure embodying, an expansible chamber adapted to receive the material to be measured, operating means for adjusting said expansible chamber to a contracted test position of predetermined fixed volume and to an open expanded position for the reception of a charge of the material, an auxiliary fixed volume fluid chamber for holding a predetermined volume of expansible fluid, fluid conduit means connecting said two containers, a source of supply of expansible fluid under pressure connected to one of said chambers, an exhaust connection, valve means for selectively connecting said two chambers and for controlling the connections to said supply and exhaust, and a pressure gage with fluid connections into said cylinder in the test position.

References Cited in the file of this patent

UNITED STATES PATENTS

| | | |
|---|---|---|
| 1,918,270 | Kegl | July 18, 1933 |
| 2,662,393 | Rzasa | Dec. 15, 1953 |
| 2,667,782 | Shea | Feb. 2, 1954 |
| 2,880,609 | Byrjett et al. | Apr. 7, 1959 |
| 2,919,573 | Berkley et al. | Jan. 5, 1960 |